United States Patent
Mahale et al.

(10) Patent No.: US 12,412,079 B2
(45) Date of Patent: Sep. 9, 2025

(54) Z-FIRST REFERENCE NEURAL PROCESSING UNIT FOR MAPPING WINOGRAD CONVOLUTION AND A METHOD THEREOF

(71) Applicant: Samsung Electronics Co., Ltd., Suwon-si (KR)

(72) Inventors: Gopinath Vasanth Mahale, Bangalore (IN); Pramod Parameshwara Udupa, Bangalore (IN); Kiran Kolar Chandrasek Haran, Bangalore (IN); Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1154 days.

(21) Appl. No.: 17/239,892

(22) Filed: Apr. 26, 2021

(65) Prior Publication Data

US 2021/0357734 A1        Nov. 18, 2021

(30) Foreign Application Priority Data

May 13, 2020   (IN) .............................. 201941039524
Oct. 23, 2020   (KR) ......................... 10-2020-0138655

(51) Int. Cl.
   *G06N 3/063*        (2023.01)
(52) U.S. Cl.
   CPC ..................................... *G06N 3/063* (2013.01)
(58) Field of Classification Search
   CPC ............ G06N 3/063; G06N 3/08; G06N 3/04; G06N 3/06
   See application file for complete search history.

(56) References Cited

U.S. PATENT DOCUMENTS 10,635,965 B2 *   4/2020   Chen ..................... G06N 3/063
2017/0011288 A1   1/2017   Brothers et al.
(Continued)

FOREIGN PATENT DOCUMENTS

WO   WO 2018/107383 A1   6/2018
WO   WO 2018/108126 A1   6/2018

OTHER PUBLICATIONS

Liqiang Lu and Yun Liang. 2018. SpWA: an efficient sparse winograd convolutional neural networks accelerator on FPGAs. In Proceedings of the 55th Annual Design Automation Conference (DAC '18). Association for Computing Machinery, New York, NY, USA, Article 135, 1-6. (Year: 2018).*

(Continued)

*Primary Examiner* — Kamran Afshar
*Assistant Examiner* — Brian J Hales
(74) *Attorney, Agent, or Firm* — NSIP Law

(57) ABSTRACT

A z-first reference neural processing unit (NPU) for mapping Winograd Convolution is disclosed where the NPU includes memory banks configured to store input feature maps (IFMs) in a z-first data storage layout, each of the memory banks being configured to store the IFMs in one of a direct convolution (DConv) mode or a Winograd convolution (WgConv) mode, a reconfigurable IFM distributor configured to receive the IFMs from the memory banks, a parallel reconfigurable Winograd forward transform module configured to receive the IFMs from the reconfigurable IFM distributor and to transform the IFMs in a Winograd domain to transformed IFMs in the WgConv mode, multiply and accumulate (MAC) units configured to perform dot product operations on one of IFMs in the DConv mode and the transformed IFMs in the WgConv mode to obtain intermediate output feature maps (OFMs), and a reconfigurable OFM adder and Winograd inverse transform module con- (Continued)

figured to generate one of an OFM from the intermediate OFMs in the DConv mode and OFMs from the intermediate OFMs in the WgConv.

18 Claims, 28 Drawing Sheets

(56) References Cited

U.S. PATENT DOCUMENTS

| | | | |
|---|---|---|---|
| 2017/0344876 A1 | 11/2017 | Brothers | |
| 2019/0042923 A1 | 2/2019 | Janedula et al. | |
| 2019/0114536 A1* | 4/2019 | Tsung | G06N 3/063 |
| 2022/0414183 A1* | 12/2022 | Zhang | G06N 3/063 |

OTHER PUBLICATIONS

Nvidia, The NVDLA Deep Learning Accelerator, Santa Clara, CA, USA, 2018, https://nvdla.org/hw/contents.html (Year: 2018).*

Yang, Chen, et al. "A reconfigurable accelerator based on fast winograd algorithm for convolutional neural network in internet of things." *2018 14th IEEE International Conference on Solid-State and Integrated Circuit Technology (ICSICT)*, IEEE, 2018 (pp. 1-3).

* cited by examiner

FIG. 2

$$B^T = \begin{array}{|c|c|c|c|} \hline 1 & 0 & -1 & 0 \\ \hline 0 & 1 & 1 & 0 \\ \hline 0 & -1 & 1 & 0 \\ \hline 0 & 1 & 0 & -1 \\ \hline \end{array} \qquad G = \begin{array}{|c|c|c|} \hline 1 & 0 & 0 \\ \hline 1/2 & 1/2 & 1/2 \\ \hline 1/2 & -1/2 & 1/2 \\ \hline 0 & 0 & 1 \\ \hline \end{array}$$

$$A^T = \begin{array}{|c|c|c|c|} \hline 1 & 1 & 1 & 0 \\ \hline 0 & 1 & -1 & -1 \\ \hline \end{array}$$

FIG. 6B

| $B^T$ | | | |
|---|---|---|---|
| 1 | 0 | 0 | 0 |
| 0 | 1 | -1 | 1 |
| -1 | 1 | 1 | 0 |
| 0 | 0 | 0 | -1 |

X

| d | | | |
|---|---|---|---|
| d0 | d1 | d2 | d3 |
| d4 | d5 | d6 | d7 |
| d8 | d9 | d10 | d11 |
| d12 | d13 | d14 | d15 |

X

| B | | | |
|---|---|---|---|
| 1 | 0 | 0 | 0 |
| 0 | 1 | -1 | 1 |
| -1 | 1 | 1 | 0 |
| 0 | 0 | 0 | -1 |

| 1 | 0 | 0 | 0 |
|---|---|---|---|
| 0 | 1 | -1 | 1 |
| -1 | 1 | 1 | 0 |
| 0 | 0 | 0 | -1 |

$B_1$

| -1 | 1 | 1 | 0 |
|---|---|---|---|
| 0 | 0 | 0 | -1 |
| 1 | 0 | 0 | 0 |
| 0 | 1 | -1 | 1 |

Transformed IFM = B^TdB

Transformed IFM = $B^T dB_1$

Transformed IFM = $B_1^T dB$

Transformed IFM = $B_1^T dB_1$

FIG. 7F

Stage 1

| 1 | 0  | -1 | 0  |
|---|----|----|----|
| 0 | 1  | 1  | 0  |
| 0 | -1 | 1  | 0  |
| 0 | 1  | 0  | -1 |

X d

| d0  | d1  | d2  | d3  |
|-----|-----|-----|-----|
| d4  | d5  | d6  | d7  |
| d8  | d9  | d10 | d11 |
| d12 | d13 | d14 | d15 |

X

Stage 2

| 1  | 0 | 0  | 0  |
|----|---|----|----|
| 0  | 1 | -1 | 1  |
| -1 | 1 | 1  | 0  |
| 0  | 0 | 0  | -1 |

FIG. 8B

| $A^T$ | | | |
|---|---|---|---|
| 1 | 1 | 1 | 0 |
| 0 | 1 | −1 | 1 |

X

| d | | | |
|---|---|---|---|
| d0 | d1 | d2 | d3 |
| d4 | d5 | d6 | d7 |
| d8 | d9 | d10 | d11 |
| d12 | d13 | d14 | d15 |

X

| A | |
|---|---|
| 1 | 0 |
| 1 | 1 |
| 1 | −1 |
| 0 | −1 |

3X1

1X3

3X3

Z-FIRST REFERENCE NEURAL PROCESSING UNIT FOR MAPPING WINOGRAD CONVOLUTION AND A METHOD THEREOF

CROSS-REFERENCE TO RELATED APPLICATION

This application claims the benefit under 35 USC § 119(a) of Indian Patent Application No. 201941039524, filed on May 13, 2020, in the Indian Intellectual Property Office and Korean Patent Application No. 10-2020-0138655, filed on Oct. 23, 2020, in the Korean Intellectual Property Office, the disclosures of which are incorporated herein by reference for all purposes.

BACKGROUND

1. Field

The present disclosure relates to neural processing unit and convolution techniques. The present disclosure particularly relates to a z-first reference neural processing unit for mapping Winograd convolution and a method thereof.

2. Description of Related Art

Many advanced applications such as image processing, machine translations, object detection, self-driving vehicles, real time facial recognition, are now processed using artificial intelligence (AI) algorithms or machine learning (ML) algorithms. A Neural Processing Unit (NPU) is a microprocessor specifically designed for acceleration of AI/ML algorithms, typically by operating on predictive models, such as artificial neural networks (ANNs), Convolutional Neural Network (CNN), Deep Convolution Networks (DCNs), random forests (RFs), Recurrent Neural Networks (RNNs), etc. NPUs may be part of a large system-on-chip (SoC) or may be part of a dedicated neural-network accelerator. The NPU enables processing of data using AI/ML algorithms on devices itself without being dependent on cloud servers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a z-first reference neural processing unit (NPU) for mapping Winograd Convolution, the NPU including memory banks configured to store input feature maps (IFMs) in a z-first data storage layout, each of the memory banks being configured to store the IFMs in one of a direct convolution (DConv) mode or a Winograd convolution (WgConv) mode, a reconfigurable IFM distributor configured to receive the IFMs from the memory banks, a parallel reconfigurable Winograd forward transform module configured to receive the IFMs from the reconfigurable IFM distributor and to transform the IFMs in a Winograd domain to transformed IFMs in the WgConv mode, multiply and accumulate (MAC) units configured to perform dot product operations on one of IFMs in the DConv mode and the transformed IFMs in the WgConv mode to obtain intermediate output feature maps (OFMs), and a reconfigurable OFM adder and Winograd inverse transform module configured to generate one of an OFM from the intermediate OFMs in the DConv mode and OFMs from the intermediate OFMs in the WgConv mode.

Each of the memory banks may be configured to store a batch of IFMs from the IFMs in the DConv mode.

The memory banks may be configured to store channels of each of coordinates of each of the IFMs in the WgConv mode as IFM blocks and a size of each of the IFM block is 4×4.

The parallel reconfigurable Winograd forward transform module may be configured to select a transform matrix and a transposed transform matrix based on a size of kernels and a position of IFM window, and transform the IFM blocks based on the size of the kernels, the transform matrix, and the transposed transform matrix to obtain the transformed IFMs.

The size of the kernels may be 3×3, and a size of the transformed IFMs may be 4×4.

The parallel reconfigurable Winograd forward transform module may be configured to select a transform matrix and a transposed transform matrix based on a size of kernels, and transform the IFM blocks based on the size of the kernels and one of the transform matrix and the transposed transform matrix to obtain the transformed IFMs.

The size of the kernels may be one of 3×1 and 1×3, and a size of the transformed IFMs may be one of 4×1 and 1×4.

The reconfigurable OFM adder and Winograd inverse transform module may be built using an OFM adder tree.

The reconfigurable OFM adder and Winograd inverse transform module may be configured to add the intermediate OFMs to obtain the OFM in the DConv mode.

The reconfigurable OFM adder and Winograd inverse transform module may be configured to select an inverse transformation matrix and a transposed inverse transformation matrix based on a size of kernels, and transform the intermediate OFMs based on the size of the kernels, the inverse transformation matrix, and the transposed inverse transformation matrix to obtain the OFMs in the WgConv mode.

The size of the kernels may be 3×3.

The reconfigurable OFM adder and Winograd inverse transform module may be configured to select an inverse transformation matrix and a transposed inverse transformation matrix based on a size of kernels, and transform the intermediate OFMs based on the size of the kernel and one of the inverse transformation matrix and the transposed inverse transformation matrix to obtain the OFMs in the WgConv mode.

The size of the kernels may be one of 3×1 and 1×3.

The NPU may include zero-skip modules to skip zero-value elements from one of the IFMs received from IFM buffers in the DConv mode and the transformed IFMs received from the parallel reconfigurable Winograd forward transform module in the WgConv mode.

In another general aspect, there is provided a method for mapping Winograd Convolution on a z-first reference neural processing unit (NPU) including receiving, by a reconfigurable IFM distributor, input feature maps (IFMs) from memory banks, wherein the IFMs are stored in a z-first data storage layout in the memory banks, each of the memory banks being configured to store the IFMs in one of a direct convolution (DConv) mode or a Winograd convolution (WgConv) mode, receiving, by a parallel reconfigurable Winograd forward transform module, the IFMs from the reconfigurable IFM distributor, transforming, by the parallel reconfigurable Winograd forward transform module, the IFMs in a Winograd domain to obtain transformed IFMs in the WgConv mode, performing, by multiply and accumulate (MAC) units, dot product operations on one of the IFMs in the DConv mode and the transformed IFMs in the WgConv mode to obtain intermediate output feature maps (OFMs), and generating, by a reconfigurable OFM adder and Winograd inverse transform module, one of an OFM from the intermediate OFMs in the DConv mode and OFMs from the intermediate OFMs in the WgConv mode.

Each of the memory banks may be configured to store channels of each of coordinates of each of the IFMs in the WgConv mode.

The transforming of the IFMs may include selecting, by the parallel reconfigurable Winograd forward transform module, a transform matrix and a transposed transform matrix based on a size of kernels and a position of IFM window, and transforming, by the parallel reconfigurable Winograd forward transform module, the IFMs based on the size of the kernels, the transform matrix, and the transposed transform matrix to obtain the transformed IFMs.

The size of the kernels may be 3×3.

The method may include selecting, by the parallel reconfigurable Winograd forward transform module, a transform matrix and a transposed transform matrix based on a size of kernels, and transforming, by the parallel reconfigurable Winograd forward transform module, the IFMs based on the size of the kernels and one of the transform matrix and the transposed transform matrix to obtain intermediate transformed IFMs.

The size of the kernels may be one of 3×1 and 1×3, a size of the intermediate transformed IFMs may be one of 4×1 and 1×4, and a size of the transformed IFMs may be 4×4.

Other features and aspects will be apparent from the following detailed description, the drawings, and the claims.

BRIEF DESCRIPTION OF THE DRAWINGS

FIG. 2 illustrates example of conventional transformation matrices for 3×3 WgConv method.

FIG. 6B illustrates example operation for forward transform in 3×3, 3×1, and 1×3 convolutions.

FIG. 7A illustrates an example transformation matrices for WgConv method with shifted IFM window.

FIG. 7F illustrates an example partial results of operation for forward transform in 4×4 blocks.

FIG. 8B illustrates an example operation for inverse transform for 3×3, 1×3 and 3×1 WgConv.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
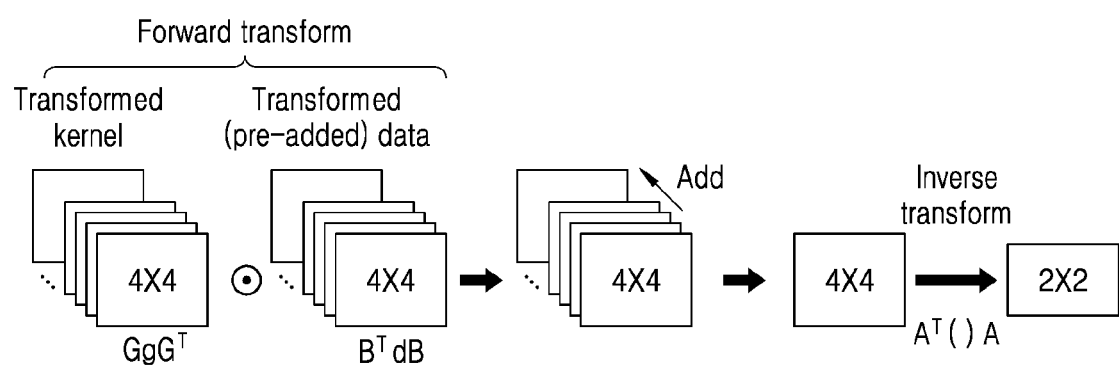
FIG. 1 illustrates an example of a conventional 2-dimensional (2D) Winograd (WgConv) method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout. Machine learning tasks, such as image classification and image segmentation, are typically implemented using DCNs. Matrix multiplication operations and convolution operations form an integral part of the present day DCNs and involve billions of such operations for image processing. Operations in DCNs consist of about 90% of convolutions which are computationally intensive. By way of example, the 3×3 convolution computations make a significantly large part of the overall computations in the present day DCNs. Typically, the convolution operations are carried out using direct convolution (DConv) algorithms/methods. There are also several fast algorithms that can reduce the computational complexity of convolutions without losing accuracy. Examples of such fast algorithms include, but are not limited to, Strassen algorithm, Winograd algorithm, Fast Fourier Transforms (FFT), Winograd minimal filtering algorithm, and Strassen-Winograd algorithms. Of these, the Winograd minimal filtering algorithm or Winograd Convolution (WgConv) method is popular. WgConv method involves reduced number of multiplications with increased number of additions and subtractions when compared to typically used DConv method. For instance, for 3×3 convolutions, the number of multiplications is reduced by approx. 2.25 times. In addition, the reduction is 1.5 times in the case of 3×1 and 1×3 convolutions. FIG. 1 illustrates an example description of a conventional 2-dimensional (2D) WgConv method. CNN typically has input feature maps (IFMs), kernels, and output feature maps (OFMs). In 2D WgConv, the IFM is segmented into blocks and each block is transformed before multiplication with transformed kernels. At end of the multiplications, resultant of the multiplied matrix is converted to the OFM. Referring to FIG. 1, the IFM is converted to a 4×4 matrix, referred to as mini-blocks in space and transformed domain. Each of the 4×4 mini-blocks (represented as "d") is transformed into WgConv domain using a transformation matrix B and a transposed transformation matrix BT to obtain a resultant 4×4 matrix BTdB. Each of the 3×3 kernel (represented as "g") is transformed into WgConv domain using transformation matrix G and a transposed transformation matrix GT to obtain a resultant 4×4 matrix GTgG. Matrices B and G specify linear combinations for inputs d and g respectively. Element wise multiplication is performed on the resultant matrices to get 4×4 intermediate OFM. In 3D WgConv, the same operations are performed on each channel of IFM and kernel and the resultant 4×4 intermediate OFMs are added together. The 4×4 intermediate OFM is transformed back to the domain of OFM, i.e., 2×2 OFM, by applying inverse transformation using transformation matrix A. The multiplication by matrices B and G is generally referred to as encoding and the multiplication by matrix A is generally referred to as decoding. FIG. 2 illustrates a conventional example of transformation matrices B, G, and A for WgConv method. The 2D WgConv can be written in matrix form as given in below equation (1), wherein Y represents the 2×2 OFM and $\odot$ indicates element-wise multiplication.

Equation 1:

$$Y = A^T[(GgG^T) \odot (B^T dB)]A \tag{1}$$

In 3D WgConv, the addition of resultant channels can be performed before the inverse transform. Due to the domination of 3×3 kernels in the present day Deep CNNs and simplicity associated with corresponding forward and inverse Winograd transforms, 3×3 kernels are generally considered as good candidates for acceleration through WgConv. In addition, 3×1 and 1×3 kernels are considered as good candidates for acceleration through WgConv due to increasing use of 1D kernels.

Figure 3:
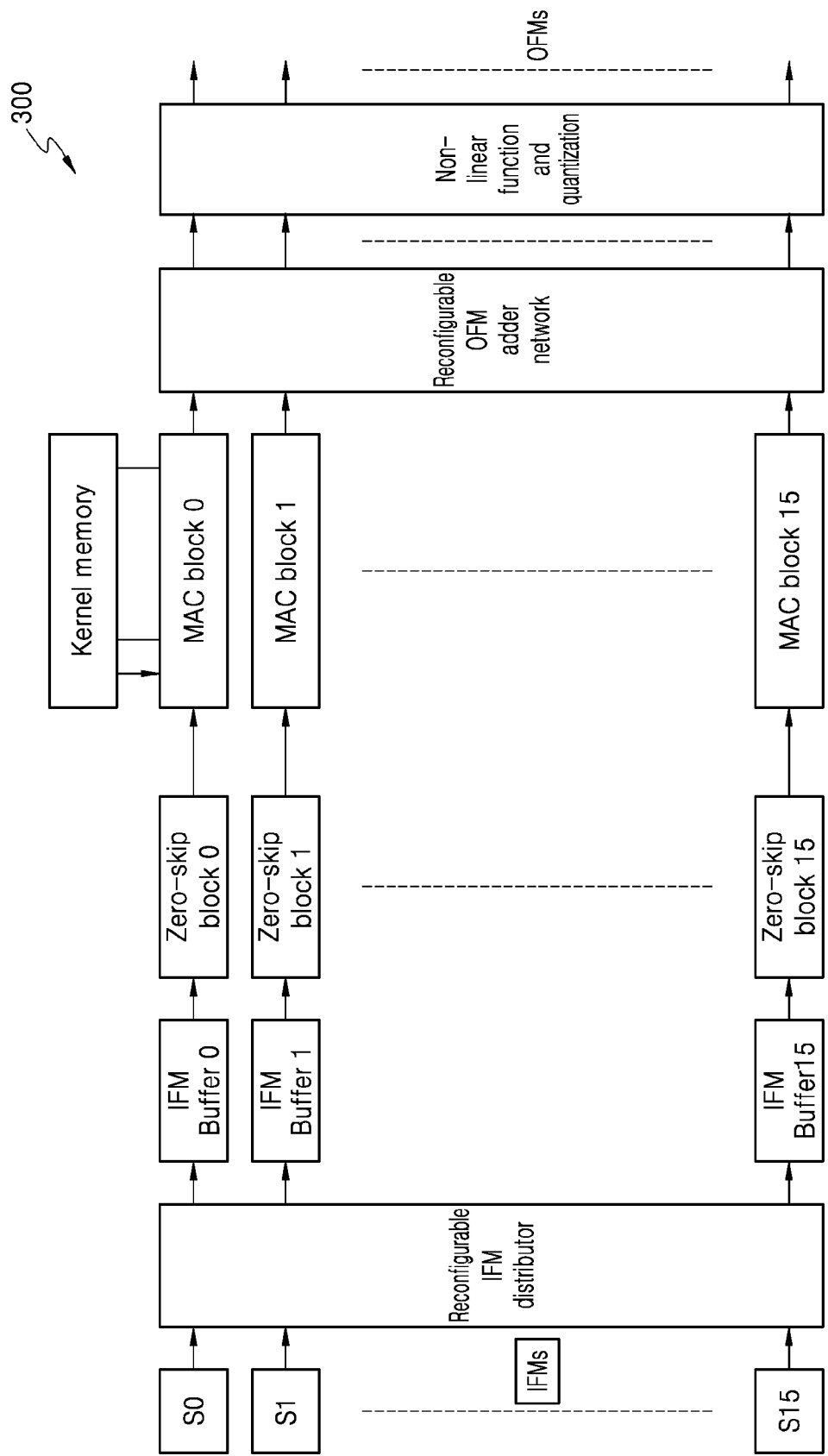
FIG. 3 illustrates example of conventional reference architecture of neural processing unit (NPU).

However, current architecture of the NPU is generally designed to implement DConv method. FIG. 3 illustrates a conventional example of reference architecture of a z-first storage NPU 300. The z-first or depth-first NPU stores IFM, kernel and OFM in z-first format, such that each memory word stores N number of pixels in z-direction (in this case N=16). During convolution, 16 pixels in z-direction of each pixel is multiplied with corresponding 16 kernel pixels in z-direction and added together (Dot product) and accumulated.

In an example, the architecture of the z-first NPU 300 includes 16 multiply-and-accumulate (MAC) blocks or multiplier arrays that include Nrowm rows and Ncolm columns. The architecture further includes 16 input memory banks, for e.g., SRAMs, to store the IFM & OFM. The memory banks store Nrowm number of IFMs in z-direction in each location. Thus, a data width of each of the 16 input memory banks is equal to Nrowm bytes. The architecture further includes a reconfigurable IFM distributer to distribute the input IFMs from the memory banks to IFM buffers by either one-to-one or one-to-many scheme based on the need. In an example, the number of IFM buffers is same as that of the number of memory banks and therefore the architecture includes 16 IFM buffers. Elements of the input IFMs from the memory banks are buffered in the corresponding IFM buffers to achieve IFM reuse that is needed while providing required higher data throughput when zeros in the IFMs are skipped. The architecture further includes 16 zero-skip blocks and a kernel memory. Each of the MAC block multiplies Nrowm number of IFMs in z-direction with corresponding elements of Ncol elements of kernel from the kernel memory and accumulates Ncolm OFMs. The zero-skip block at the input of each MAC block improves MAC utilization by borrowing non-zero elements from the next few Nrowm length IFM elements to fill the places with data equal to zero, and thus accelerating the computations. The architecture further includes reconfigurable OFM adder network that adds the output OFMs from the 16 MAC blocks together depending on the MAC configuration. The architecture also includes a non-linear function and quantization unit coupled to the reconfigurable OFM adder network to quantize in-network non-linearities and weights and provide quantized OFMs. Through quantization the OFM width is typically brought back to the IFM width. Such quantization of OFMs significantly reduces width of OFMs increased as a result of multiple MAC operations.

Figure 4A:
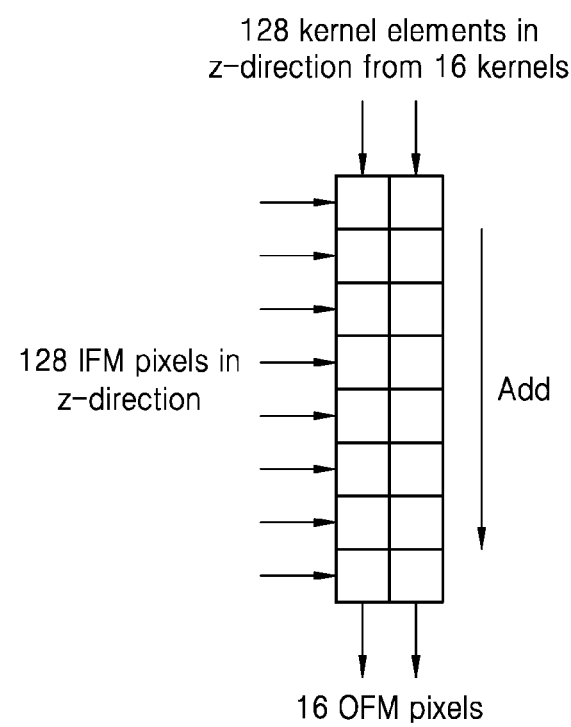
FIG. 4A to FIG. 4E illustrates different conventional configurations of multiplication and accumulation (MAC) blocks based on input feature map (IFM) and output feature map (OFM) dimensions for maximum resource utilization.
Figure 4B:
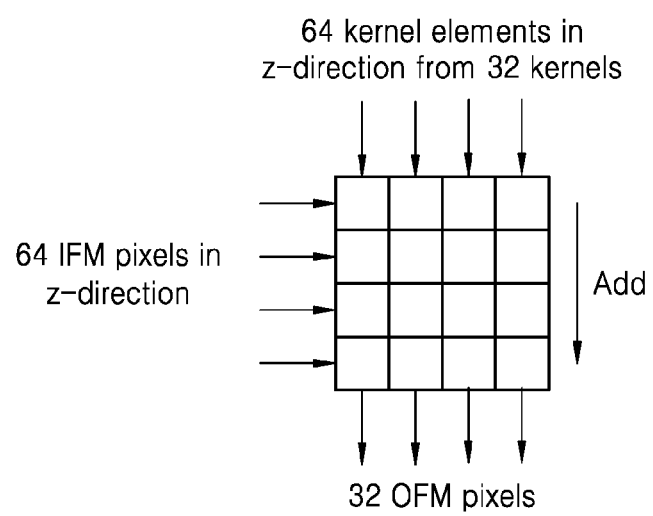
Figure 4C:
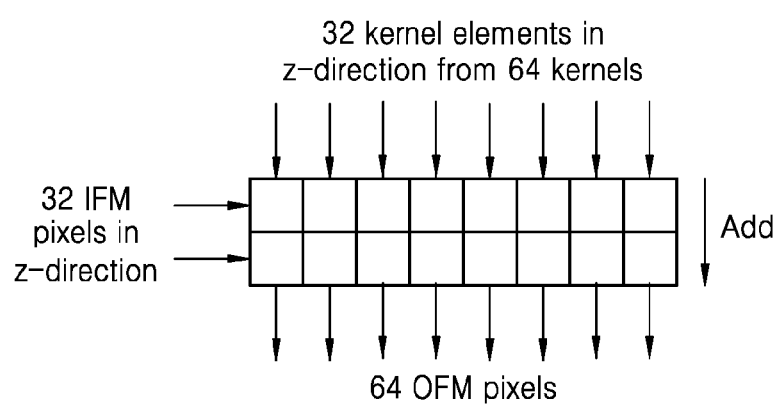
Figure 4D:
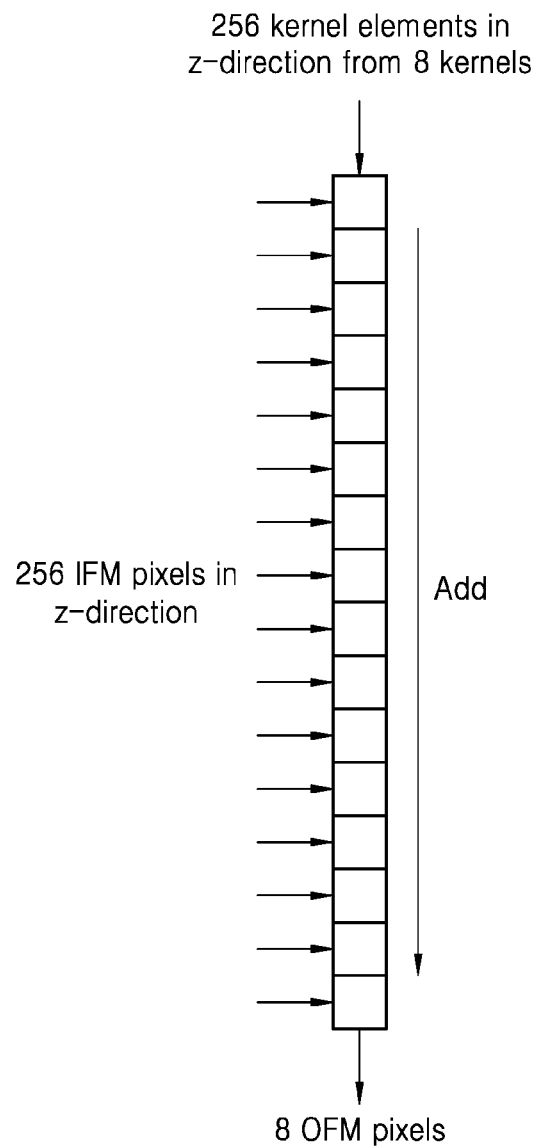
Figure 4E:
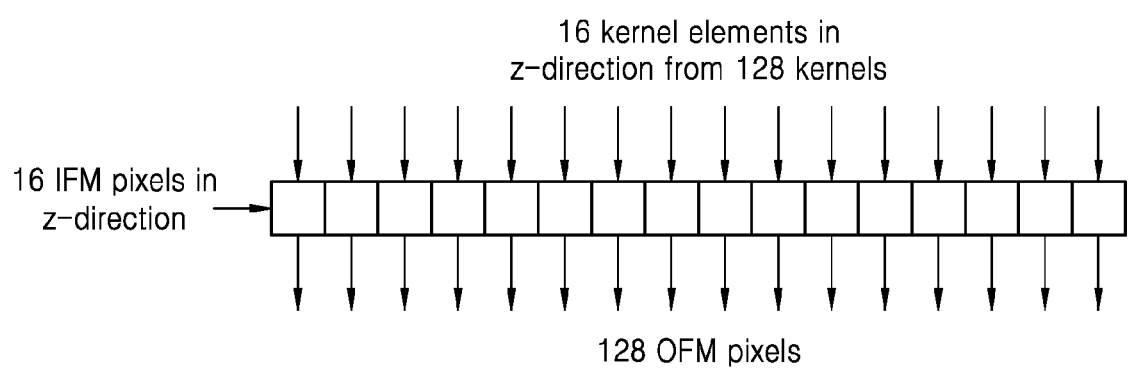

FIG. 4A to FIG. 4E illustrates different examples of conventional configurations of MAC blocks based on the IFM and OFM dimensions for maximum resource utilization. Addition of OFM pixels in vertical direction takes place in the re-configurable OFM adder network, as illustrated in FIG. 3. MAC configuration specifies the way MAC blocks are connected. Based on the number of IFM channels, OFM channels etc., different configurations can be used to achieve maximal resource utilization. Referring to FIG. 4A, 16 intermediate OFM pixels are generated when 128 IFM pixels, traversed in z-direction, are multiplied with 128 kernel elements in z-direction from 16 kernels. Referring to FIG. 4B, 32 intermediate OFM pixels are generated when 64 IFM pixels, traversed in z-direction, are multiplied with 64 kernel elements in z-direction from 32 kernels. Referring to FIG. 4C, 64 intermediate OFM pixels are generated when 32 IFM pixels, traversed in z-direction, are multiplied with 32 kernel elements in z-direction from 64 kernels. Referring to FIG. 4D, 8 intermediate OFM pixels are generated when 256 IFM pixels, traversed in z-direction, are multiplied with 256 kernel elements in z-direction from 8 kernels. Referring to FIG. 4E, 128 intermediate OFM pixels are generated when 16 IFM pixels, traversed in z-direction, are multiplied with 16 kernel elements in z-direction from 128 kernels.

Thus, the conventional architecture of NPU is tightly tuned to DConv and specific NPU is required for implementing WgConv method. As such, existing NPUs tuned to implement DConv method cannot implement WgConv method. For e.g., traversal of IFM using DConv requires that each MAC block receive a set of 16 pixels in z-direction. All these sets belong to same x-y position of the IFM. However, using the same format for WgConv is not possible as 4×4 adjacent pixels in a block of IFM are required together for the transform. DConv and WgConv have best results for different input and output traversals which make it difficult to map them on the same architecture. Further, DConv and WgConv require different data layouts. Therefore, the existing NPUs are not able to achieve higher performances.

Some solutions are designed to overcome at least one of the aforementioned problems. In one solution, 3×3 WgConv operations are mapped on an older version of NPU architecture. Such architecture has a basic MAC unit as dot product module of vector length 8. Each MAC unit consists of such 16 dot product modules and the NPU architecture consists of 16 such MAC units. The dot product module receives transformed IFM pixels and kernel weights that contribute to a single OFM pixel. Such 16 dot product modules housed in a MAC unit produce OFMs of same channel but different x-y locations. Such 16 MAC units work on 16 OFM channels in parallel. Kernel zero skipping is implemented through a separate Request Assembly Unit (RAU) associated with every MAC unit that receives request from IDP to generate OFM values corresponding to non-zero kernel elements. Such multiple requests from different IFM batches are packed together and executed on the dot product modules for maximal resource utilization. However, this solution introduces considerably large additional hardware in the architecture. This leads to complex and dense wiring between input memory banks and MAC units. Further, IFM, kernel, and OFM are stored in x-y first format which make operations like dilated and strided convolutions difficult to implement.

In another solution, convolution unit contains 1024 MACs (16 MAC units consisting of 64 multipliers each) for INT16(16-bit integer)/fp16(Half precision Floating Point) or 2048 MACs for int8 (8-bit integer). The atomic operation is dot product of two vectors of 64 elements each. For DConv mode, 1×1×64 block of weight matrix is multiplied with corresponding IFM pixels (rounded to 8 bits) and the resultant 1×64 vector components are added together. For 3×3 WgConv mode, a 4×4×4 sized transformed kernel block is multiplied with corresponding forward transformed IFM pixels and the resultant vector elements are selectively added in z-direction. The data path of MAC units is designed to selectively add the products for WgConv mode and full summation for DConv mode. The memory module having 512 kB, may internally comprise of 16 number of 512-bit memory banks. Thus, the data path and memory banks are designed considering both DConv mode and WgConv mode and an integrated data-path is designed for Winograd inverse transforms. Also, the traversal order is substantially in line with both the DConv mode and the WgConv mode. However, the solution does not include kernel or IFM zero skipping. Further, there are overheads in rearranging the IFM into the required format (i.e., 4×4×4) for WgConv mode. Furthermore, the inverse transform is at the level of the MAC units that can be performed only once after the summation of intermediate OFMs from all channels.

Figure 5:
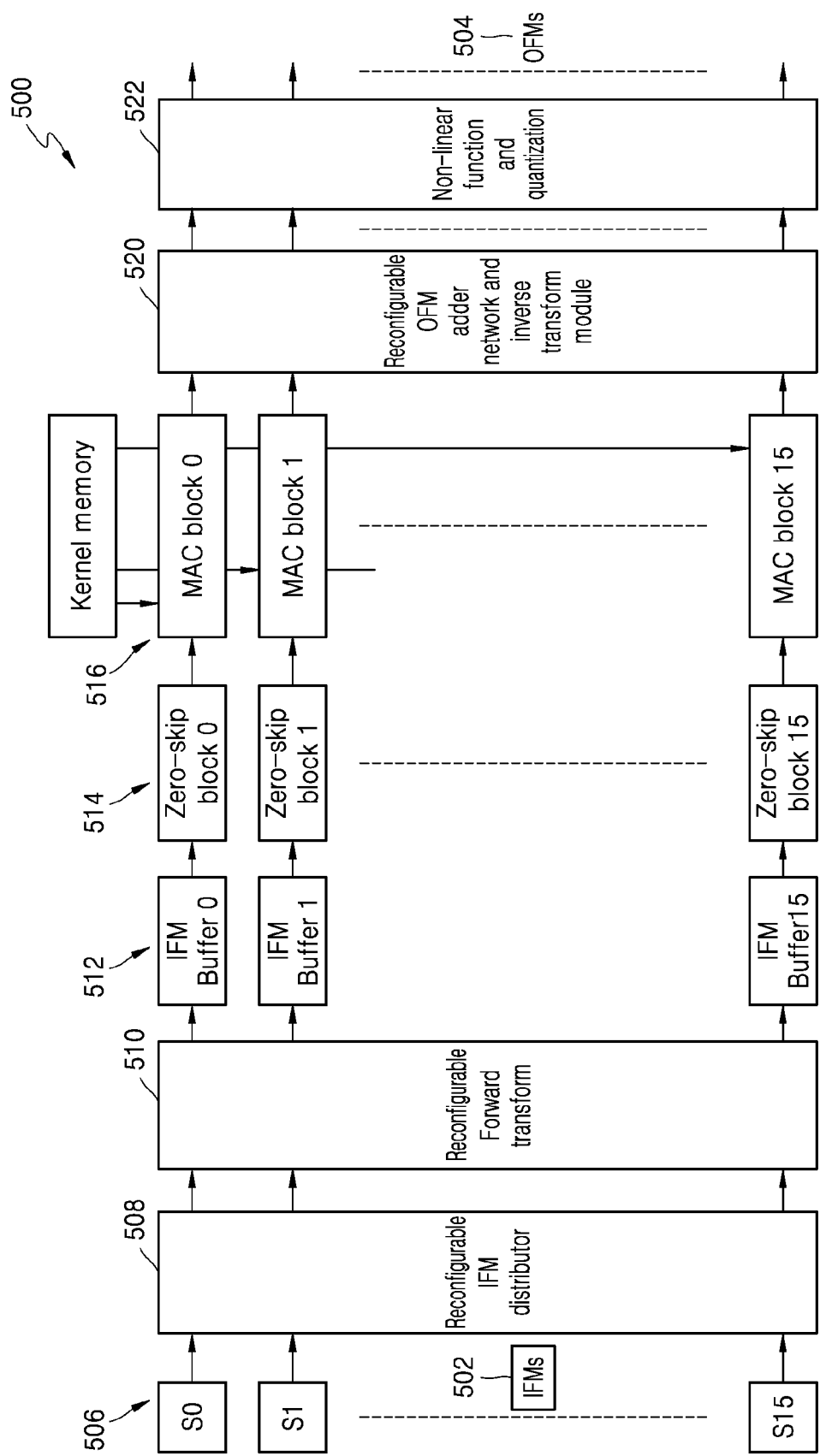
FIG. 5 illustrates an example reference architecture of z-first reference neural processing unit (NPU) for mapping WgConv.

FIG. 5 illustrates an example reference architecture of z-first reference neural processing unit (NPU) 500 for mapping Winograd Convolution (WgConv). As would be understood, the z-first NPU typically performs convolutions as explained earlier.

Referring to FIG. 5, the z-first NPU 500 process input feature maps (IFMs) 502 in either of Direct Convolution (DConv) mode or Winograd convolution (WgConv) mode. In DConv mode, direct convolutions are performed on the IFMs 502 to obtain output feature maps (OFMs) 504. In WgConv mode, Winograd convolutions are performed on the IFMs 502 to obtain a number of OFMs 504. As such, architecture of the z-first NPU 500 includes a plurality of memory banks 506, a reconfigurable IFM distributor 508, a parallel reconfigurable Winograd forward transform module 510, a plurality of IFM buffers 512, a plurality of zero-skip blocks 514, a plurality of multiply and accumulate (MAC) units 516, a plurality of kernel memory banks 518, a reconfigurable OFM adder and Winograd inverse transform module 520, and a non-linear function and quantization unit 522. The aforementioned units operate on the IFMs 502 in one of the DConv mode and the WgConv mode. The following paragraphs describe operations in both modes.

The plurality of memory banks 506 is configured to store the plurality IFMs 502 in a z-first data storage layout. Example of the memory bank includes Static Random Access Memories (SRAMs). Each of the plurality of memory banks 506 is configured to store the plurality of IFMs 502 in one of the DConv mode and the WgConv mode. In the DConv mode, each of the plurality of memory banks 506 is configured to store a batch of IFMs 502 from the plurality of IFMs 502. In the WgConv mode, each of the plurality of memory banks 506 are configured to store a plurality of channels of each of plurality of coordinates of each of the plurality of IFMs 502 as a plurality of IFM blocks and size of each of the IFM block is 4×4.

The reconfigurable IFM distributor 508 receives the plurality of IFMs 502 from the plurality of memory banks 506.

In the DConv mode, the reconfigurable IFM distributor 508 distributes the input IFMs 502 from the memory banks 506 to the plurality of IFM buffers 512 by either one-to-one or one-to-many scheme. In the WgConv mode, the reconfigurable IFM distributor 508 provides the input IFMs 502 to the parallel reconfigurable Winograd forward transform module 510. The parallel reconfigurable Winograd forward transform module 510 transforms the plurality of IFMs 502 in a Winograd domain to obtain a plurality of transformed IFMs.

In an example, a size of the plurality of kernels is 3×3 and size of the plurality of transformed IFMs is 4×4. In such implementation, the parallel reconfigurable Winograd forward transform module 510 selects a transform matrix and a transposed transform matrix based on the size of the plurality of kernels and a position of IFM window. In an example, the parallel reconfigurable Winograd forward transform module 510 transforms the plurality of IFM blocks based on the size of the plurality of kernels and position of IFM window to obtain the plurality of transformed IFMs.

In an example, a size of the plurality of kernels is one of (a) 3×1 and (b) 1×3, and size of the plurality of transformed IFMs is one of (a) 4×1 and (b) 1×4. In such an implementation, the parallel reconfigurable Winograd forward transform module 510 selects a transform matrix and a transposed transform matrix based on the size of a plurality of kernels. The parallel reconfigurable Winograd forward transform module 510 transform the plurality of IFM blocks based on the size of the plurality of kernels and one of (a) size of kernel, and (b) position of the IFM window.

In the DConv mode, the plurality of MAC units 516 performs dot product operations or element wise multiplication on the plurality of IFMs 502 using plurality of kernels from the plurality of kernel memory banks 518. The plurality of zero-skip modules 514 skips zero-value elements from the plurality of IFMs 502 received from the plurality of IFM buffers 512 prior to providing the plurality of IFMs 502 as input to the plurality of MAC units 516.

In the WgConv mode, the plurality of MAC units 516 performs element wise multiplication on the plurality of transformed IFMs to obtain a plurality of intermediate output feature maps (OFMs) using the plurality of kernels from the plurality of kernel memory banks 518. The plurality of zero-skip modules 514 skips zero-value elements from the plurality of transformed IFMs received from the parallel reconfigurable Winograd forward transform module 510 prior to providing the plurality of transformed IFMs as input to the plurality of MAC units 516.

In the DConv mode, the reconfigurable OFM adder and Winograd inverse transform module 520 generates an OFM 504 from the plurality of intermediate OFMs. In an example, the reconfigurable OFM adder and Winograd inverse transform module 520 add the plurality of intermediate OFMs to obtain the OFM 504. In the WgConv mode, the reconfigurable OFM adder and Winograd inverse transform module 520 generates plurality of OFMs 504 from the plurality of intermediate OFMs by Winograd inverse transform.

In an example, a size of the plurality of kernels is 3×3. In such an implementation, the reconfigurable OFM adder and Winograd inverse transform module 520 selects an inverse transformation matrix and a transposed inverse transformation matrix based on a size of a plurality of kernels. The reconfigurable OFM adder and Winograd inverse transform module 520 transforms the plurality of intermediate OFMs based on the size of the plurality of kernels to obtain the plurality of OFMs 504.

In an example, a size of the plurality of kernels is one of (a) 3×1 and (b) 1×3. In such an implementation, the reconfigurable OFM adder and Winograd inverse transform module 520 selects an inverse transformation matrix and a transposed inverse transformation matrix based on a size of the plurality of kernels. The reconfigurable OFM adder and Winograd inverse transform module 520 transforms the plurality of intermediate OFMs based on the size of the kernel and one of (a) the inverse transformation matrix and (b) the transposed inverse transformation matrix to obtain the plurality of OFMs 504.

The non-linear function and quantization unit 522 quantizes in-network non-linearities and weights and provides quantized OFM in DConv mode and a plurality of quantized OFMs in WgConv mode.

In the illustrated example, each of the IFM 502 is of a size H (height)×W (width)×number of channels. As such, the NPU 500 includes 16 number of the MAC units 516 (represented as MAC block 0 to MAC block 15), which includes Nrowm rows and Ncolm columns. In an example, each MAC 516 multiplies each Nrow pixels with each of Nrow elements of Ncol kernels for Dot product. As such, the NPU 500 includes 16 number of the memory banks 506 (represented as S0 to S15) to store the IFMs 502 & the OFMs 504, 16 number of IFM buffers 512 (represented as IFM Buffer0 to IFM Buffer15), and 16 number of zero-skip blocks 514 (represented as zero-skip block 0 to zero-skip block 15). In the DConv mode, the plurality of IFMs 502 are stored as N batches in each of the memory banks 506 and then sent to the reconfigurable IFM distributor 508. In the WgConv mode, each 4×4 IFM block in each channel of the IFM 502 is converted from space to transformed domain. To implement this, the IFM blocks of each channel are stored in 16 memory banks such that 16 pixels (in x-y) of each IFM block are stored in different memory banks. Each of the IFM blocks are then sent to the parallel reconfigurable Winograd forward transform module 510.

Figure 6A:
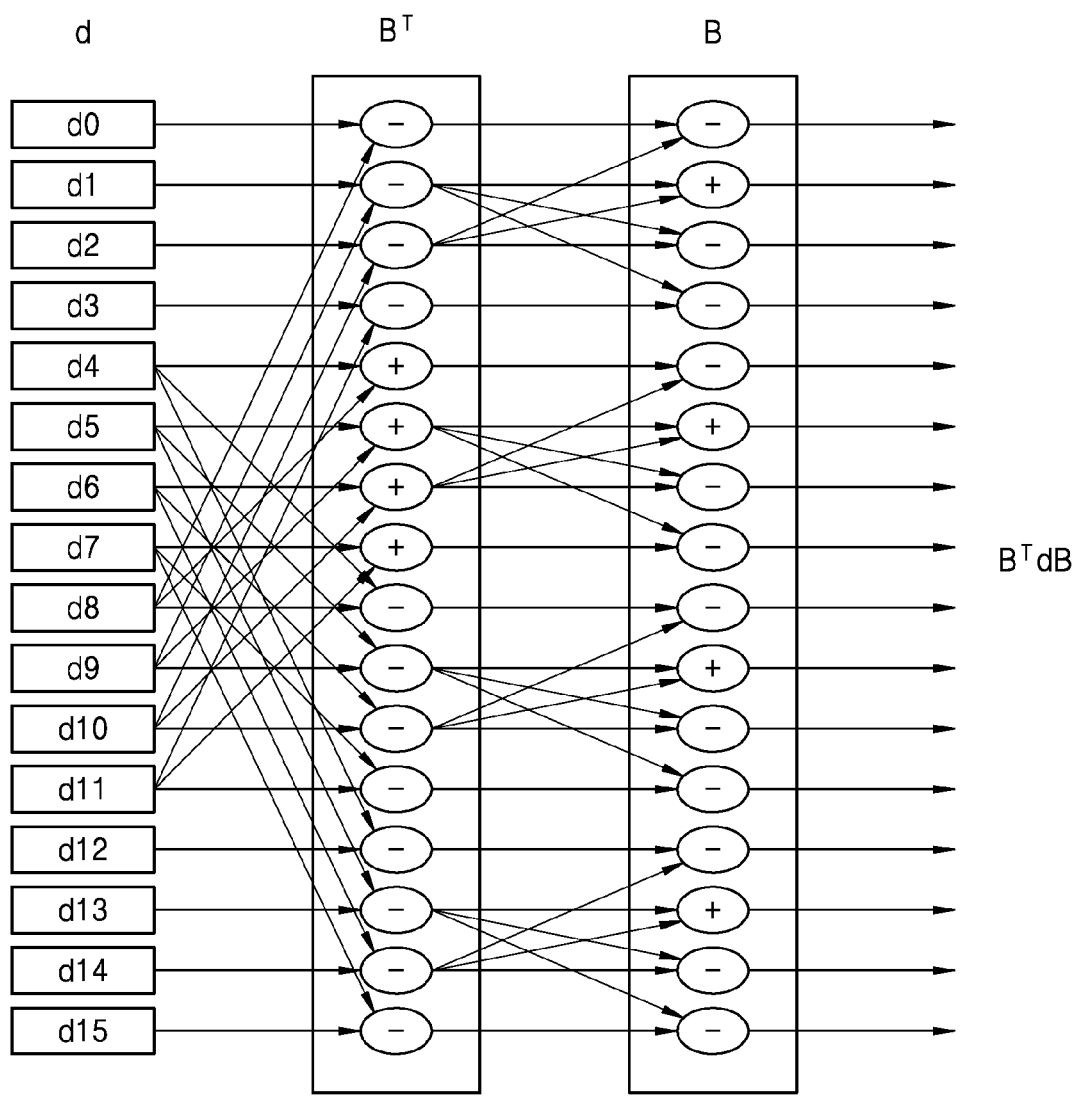
FIG. 6A illustrates an example hardware architecture of parallel reconfigurable Winograd forward transform module for forward transform of IFM in the case of 3×3 kernel.

In an example, the parallel reconfigurable Winograd forward transform module 510 includes two stages of adders with 16 adders or forward transform blocks. Such 16 forward transform blocks work in parallel in computing forward transforms each for 16 channels of IFM 502, i.e., pixels of a channel from every memory bank 506 is sent to one forward transform block. Thus, the parallel reconfigurable Winograd forward transform module 510 includes 16 forward transform blocks to process 16 channels. Referring to FIG. 6A, an example of hardware architecture of parallel reconfigurable Winograd forward transform module 510 for forward transform of IFM is illustrated. The 4×4 IFM blocks of each channel is distributed in 16 memory banks as d0 to d15. Each of the 4×4 IFM blocks is transformed into WgConv domain using a transformation matrix B and a transposed transformation matrix BT to obtain a resultant 4×4 matrix or the transformed IFM BTdB. FIG. 6B illustrates example transformation matrix B and transposed transformation matrix BT.

Figure 7B:
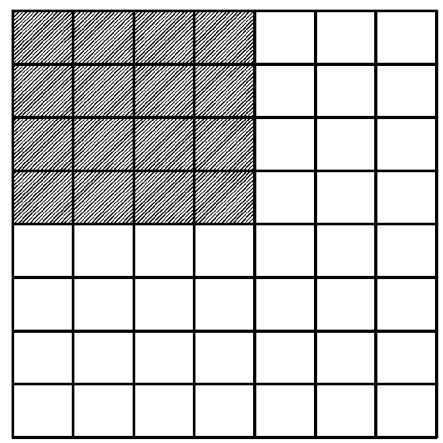
FIG. 7B to FIG. 7E illustrates an example of forward transform of IFMs based on position of IFM window using the transformation matrices illustrated in FIG. 7A.
Figure 7C:
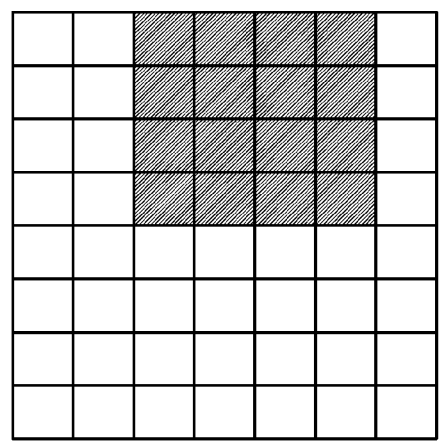
Figure 7D:
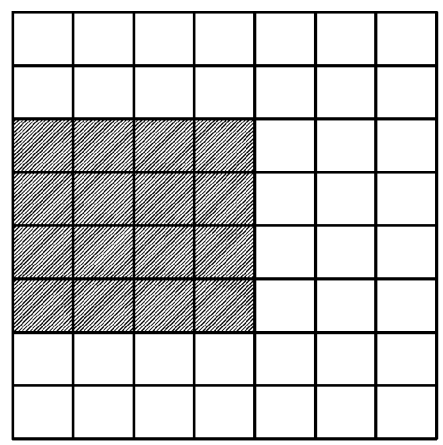
Figure 7E:
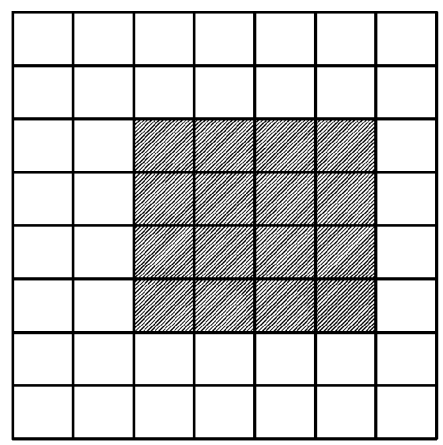

To support WgConv forward transform for shifted 4×4 IFM blocks, heavy multiplexers are needed at the outputs of the memory banks 506 to route the data to appropriate MAC blocks 516. Hence, in the present embodiment, different forward transform coefficients or matrices are implemented for four possible different shifts of 4×4 IFM block. FIG. 7A illustrates example transformation matrix B and transformation matrix B1. The transformation matrix B1 is a row-wise circularly shifted version of transformation matrix B. FIG. 7B to FIG. 7E illustrates different transformed IFMs using the transformation matrices illustrated in FIG. 7A. Referring to FIG. 7B, transformed IFM BTdB is obtained using the transformation matrix B and transposed transformation matrix BT. Referring to FIG. 7C, transformed IFM BTdB$_1$ is obtained using the transformation matrix B1 and transposed transformation matrix BT. Referring to FIG. 7D, transformed IFM B$_1$TdB is obtained using the transformation matrix B and transposed transformation matrix B1T. Referring to FIG. 7E, transformed IFM B$_1$TdB$_1$ is obtained using the transformation matrix B1 and transposed transformation matrix B1T. This results in two sets of coefficients for each stage of forward transform, resulting in totally four modes of operation, as illustrated in FIG. 7F.

Figure 6C:
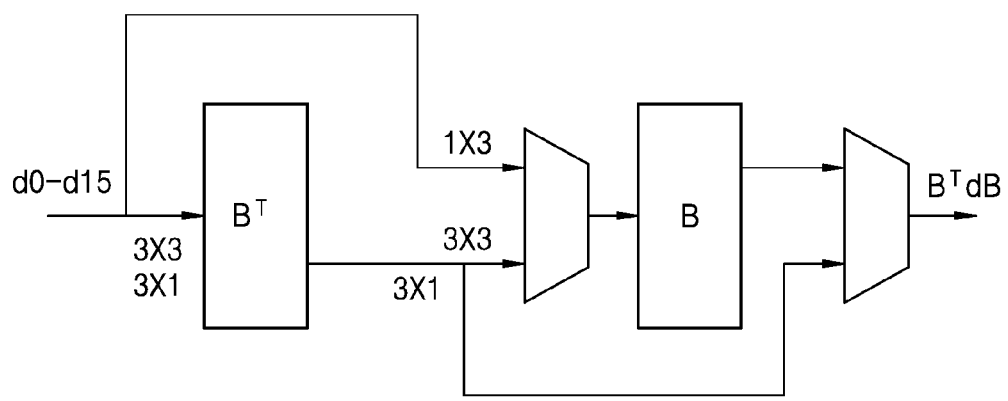
FIG. 6C illustrates example of overall architecture for forward transform.

In an example, the transform matrix B and a transposed transform matrix BT are selected based on a size of the plurality of kernels and a position of IFM window. Referring to FIG. 6B, if the size of the kernel is 3×3, then transform matrix B and a transposed transform matrix BT are selected and used for transforming the 4×4 IFM blocks into 4×4 transformed IFM BTdB. If the size of the kernel is 3×1, then transform matrix B is selected and used for transforming the 4×4 IFM blocks into 4×1 transformed IFM BTdB. If the size of the kernel is 1×3, then transposed transform matrix BT is selected and used for transforming the 4×4 IFM blocks into a set of 1×4 transformed IFM BTdB. Accordingly, FIG. 6C illustrates the example overall architecture for forward transform in accordance with some embodiments.

In the DConv mode, the 3×3 kernel is used directly for performing element wise multiplication to obtain the plurality of intermediate OFMs. In the WgConv mode, each of the 3×3 kernel (represented as "g") is transformed into WgConv domain using transformation matrix G and a transposed transformation matrix GT during offline processing to obtain a resultant 3×3 kernel matrix GTgG. In an example, the multiply and accumulate (MAC) units 516 perform the element wise multiplication to obtain 4×4 intermediate OFMs.

In an example, each of the 3×1 kernel (represented as "g") is transformed into WgConv domain using transformation matrix G and a transposed transformation matrix GT to obtain a resultant 3×1 kernel matrix GTgG. In an example, the MAC unit 516 performs the element wise multiplication to obtain 4×4 resultant convolution matrices. The resultant convolution matrices are added to obtain 4×4 intermediate OFMs.

In an example, each of the 1×3 kernel (represented as "g") is transformed into WgConv domain using transformation matrix G and a transposed transformation matrix GT to obtain a resultant 1×3 kernel matrix GTgG. In an example, the MAC unit 516 performs the element wise multiplication to obtain 4×4 resultant convolution matrices. The resultant convolution matrices are added to obtain 4×4 intermediate OFMs.

Figure 8A:
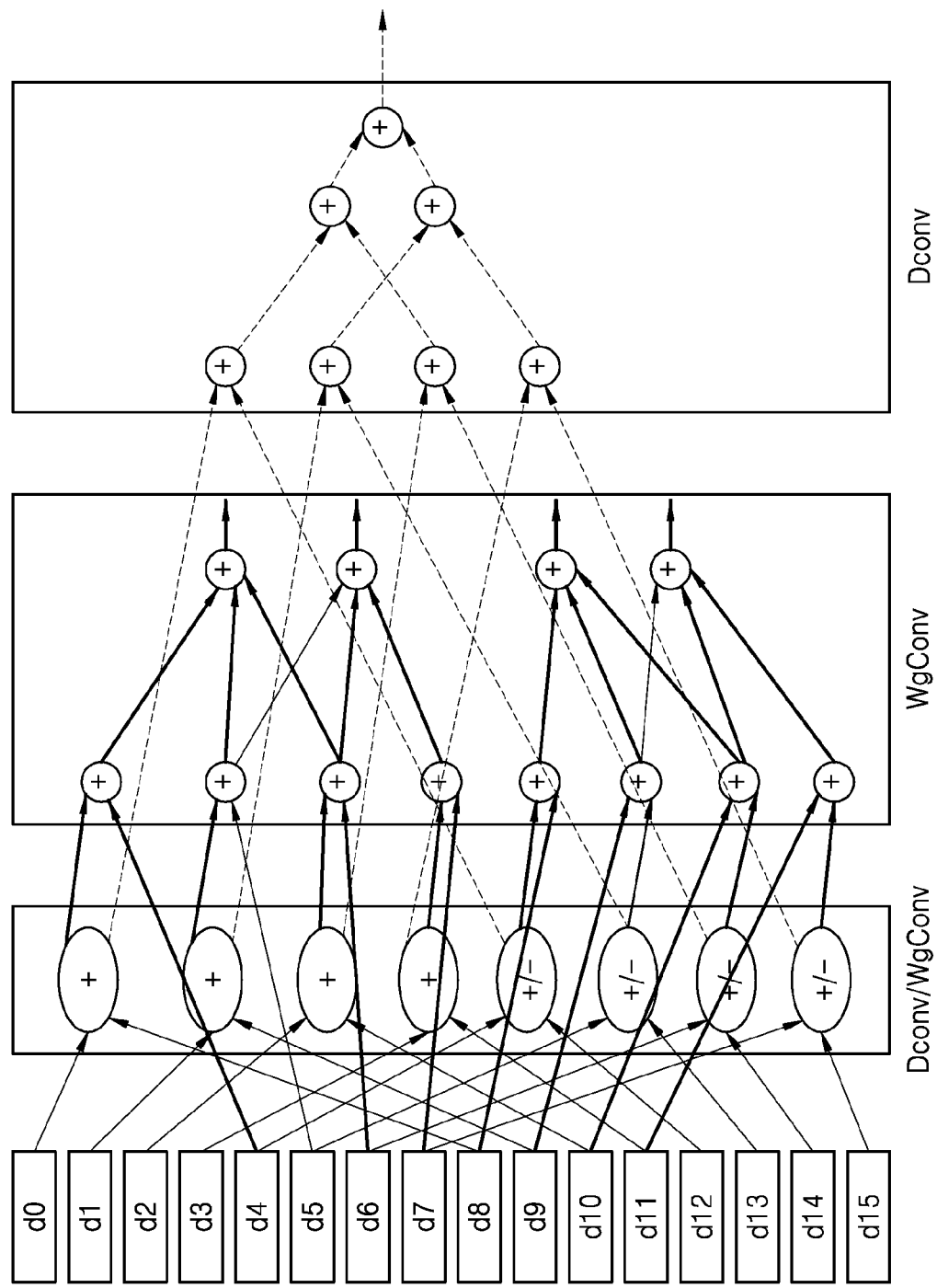
FIG. 8A illustrates an example hardware architecture of reconfigurable OFM adder and Winograd inverse transform module.

The reconfigurable OFM adder and Winograd inverse transform module 520 is built by partially re-using the OFM adder tree. The output adder tree enables to take output from any of the adder levels of DConv based on the selected mode of MAC connectivity. As such, the first level of adders from DConv adder tree is reused in computing WgConv inverse transform by introducing re-configurability. FIG. 8A illustrates an example of hardware architecture of reconfigurable OFM adder and Winograd inverse transform module.

FIG. 8B illustrates example partial results of operation for inverse transform. Referring to FIG. 8B, if the size of the kernel is 3×3, the 4×4 intermediate OFM is transformed back to the domain of OFM, i.e., 2×2 OFM, by applying inverse transformation using inverse transformation matrix A and transposed inverse transformation matrix AT. In a similar manner, if the size of the kernel is 3×1, the 4×4 intermediate OFM is transformed back to the domain of OFM, i.e., 2×1 OFM, by applying inverse transformation using inverse transposed inverse transformation matrix AT. In a similar manner, if the size of the kernel is 1×3, the 4×4 intermediate OFM is transformed back to the domain of OFM, i.e., 1×2 OFM, by applying inverse transformation using inverse transformation matrix A.

Figure 9A:
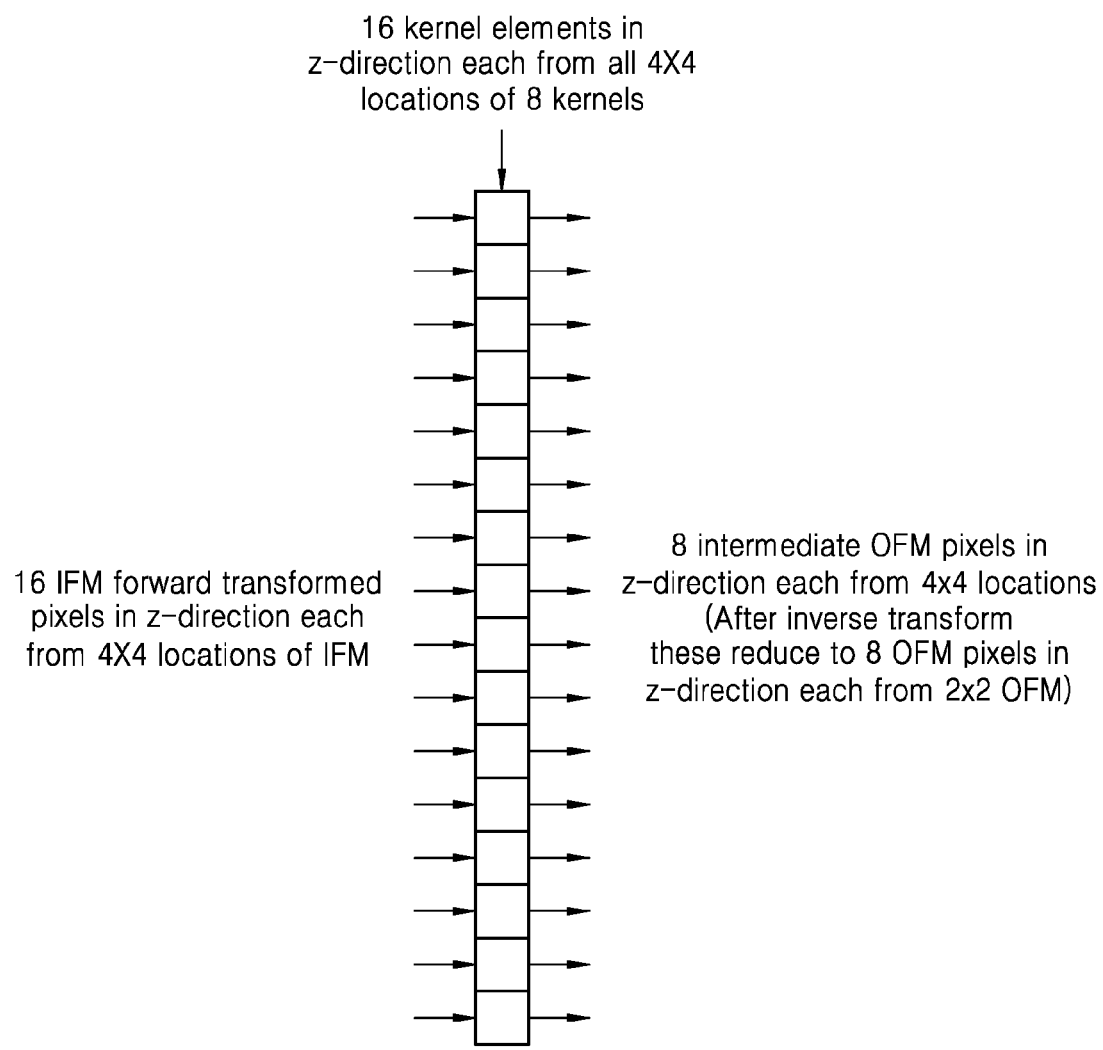
FIG. 9A illustrates an example of configuration of multiplication and accumulation (MAC) blocks for WgConv mode.
Figure 9B:
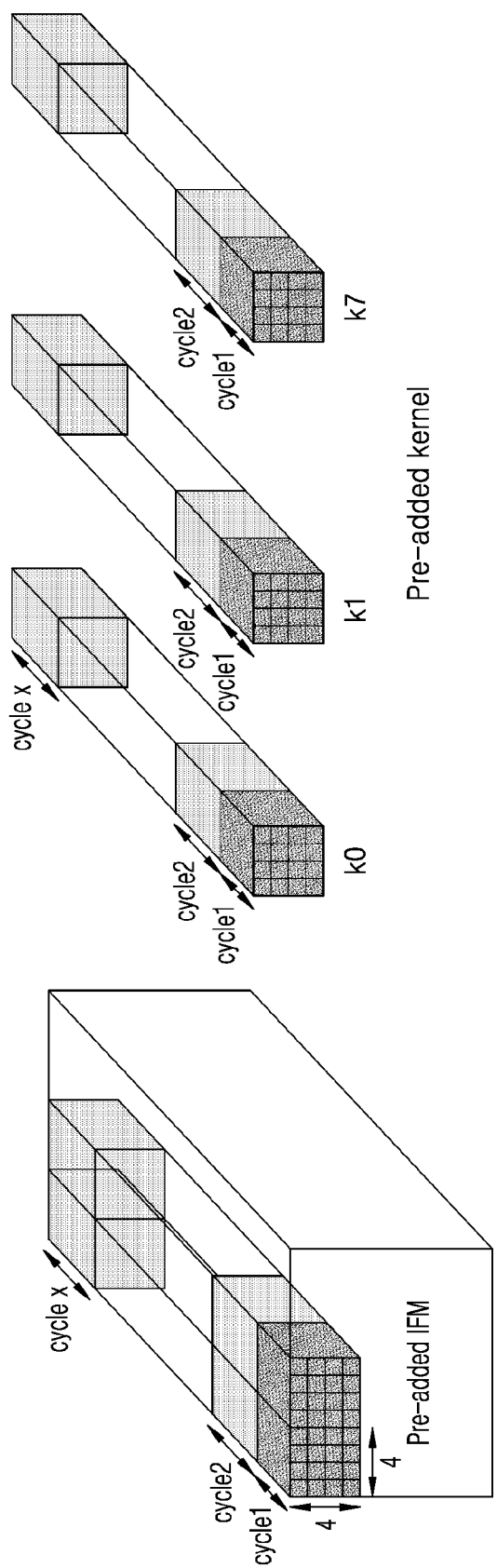
FIG. 9B illustrates an example of data traversal for WgConv.

FIG. 9A illustrates an example of MAC tile configuration and FIG. 9B illustrates an example of data traversal for 3×3 WgConv. Referring to FIG. 9A, as illustrated, 16 pixels from 4×4 forward transformed IFM block are fed to different MAC blocks and corresponding intermediate OFMs are received as outputs upon accumulation. At the output, 8 intermediate blocks of 4×4 intermediate OFMs are received, which, upon inverse transform, become 8 number of 2×2 blocks of final OFMs.

Referring to FIG. 9B, an IFM divided into 4×4 blocks is shown. Furthermore, the data stored in each memory word is shown (16 pixels in z-direction). The forward transformed pixels from each location of 4×4 IFM block are fed to different MAC blocks. After that next 16 pixels in z-direction from the same 4×4 blocks are fed to MAC blocks in a similar way. The traversal is chosen in such a way that the zero skipping can be implemented under every MAC block as the subsequent computations contribute to the same intermediate OFM pixels. The accumulated results from 16 MAC blocks are passed on to the inverse transform module to get the final 2×2 OFM. The same computations are performed for the overlapped blocks of IFMs (blocks of 4×4 shifted by two pixels from the original blocks).

Figure 10A:
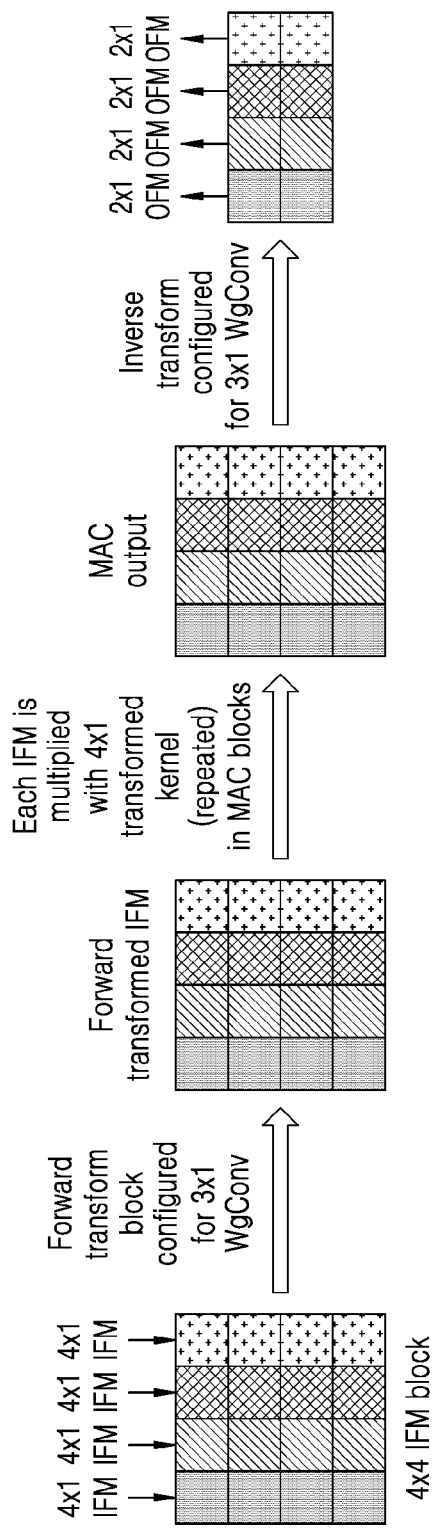
FIG. 10A to FIG. 10B illustrates an example of a configuration of multiplication and accumulation (MAC) blocks for traversal of IFM for 3×1 kernel and 1×3 kernel.
Figure 10B:
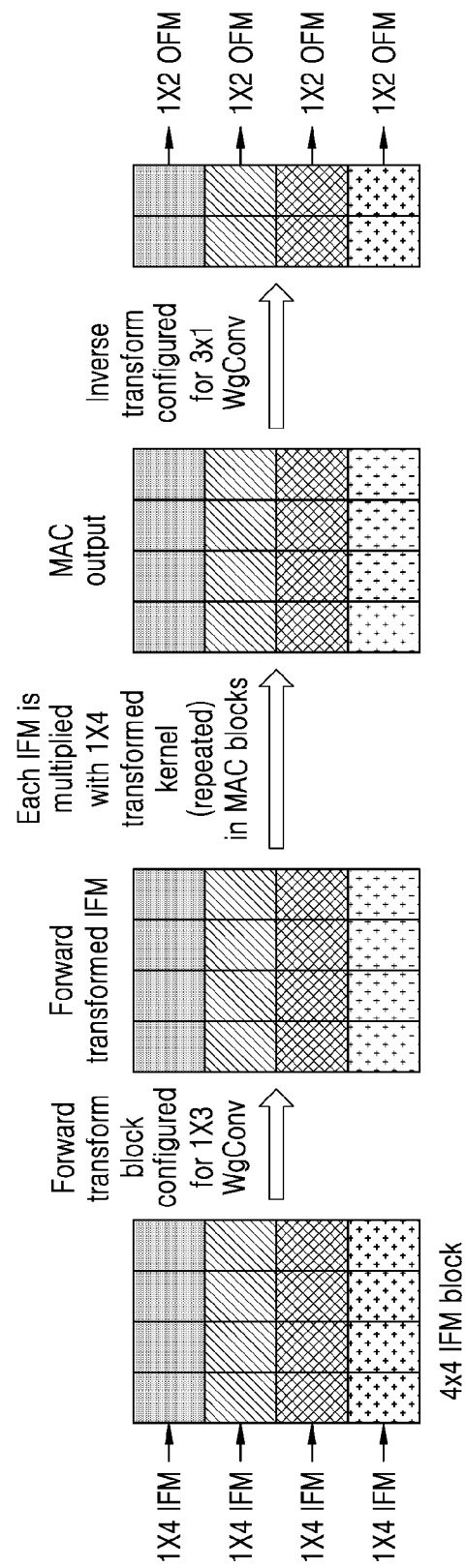

FIG. 10A to FIG. 10B illustrates example configuration of MAC blocks for traversal of IFM for 3×1 kernel and 1×3 kernel. Referring to FIG. 10A, each 4×4 IFM block includes four 4×1 IFM blocks. The four 4×1 IFMs in 4×4 blocks are forward transformed based on 3×1 kernel to obtain transformed IFM. Each IFM is multiplied with 4×1 transformed kernel (repeated) in MAC blocks to obtain 4×4 intermediate OFMs as MAC output. Each of the 4×4 intermediate OFMs are inverse transformed based on 3×1 kernel to obtain 2×4 OFM comprising of four 2×1 OFMs. Referring to FIG. 10B, each 4×4 IFM block includes four 1×4 IFM blocks. The four 1×4 IFMs in 4×4 IFM block are forward transformed based on 1×3 kernel to obtain transformed IFM. Each IFM is multiplied with 1×4 transformed kernel (repeated) in MAC blocks to obtain 4×4 intermediate OFMs as MAC output. Each 4×4 intermediate OFMs are inverse transformed based on 1×3 kernel to obtain 4×2 OFM comprising of four 1×2 OFMs.

Figure 11:
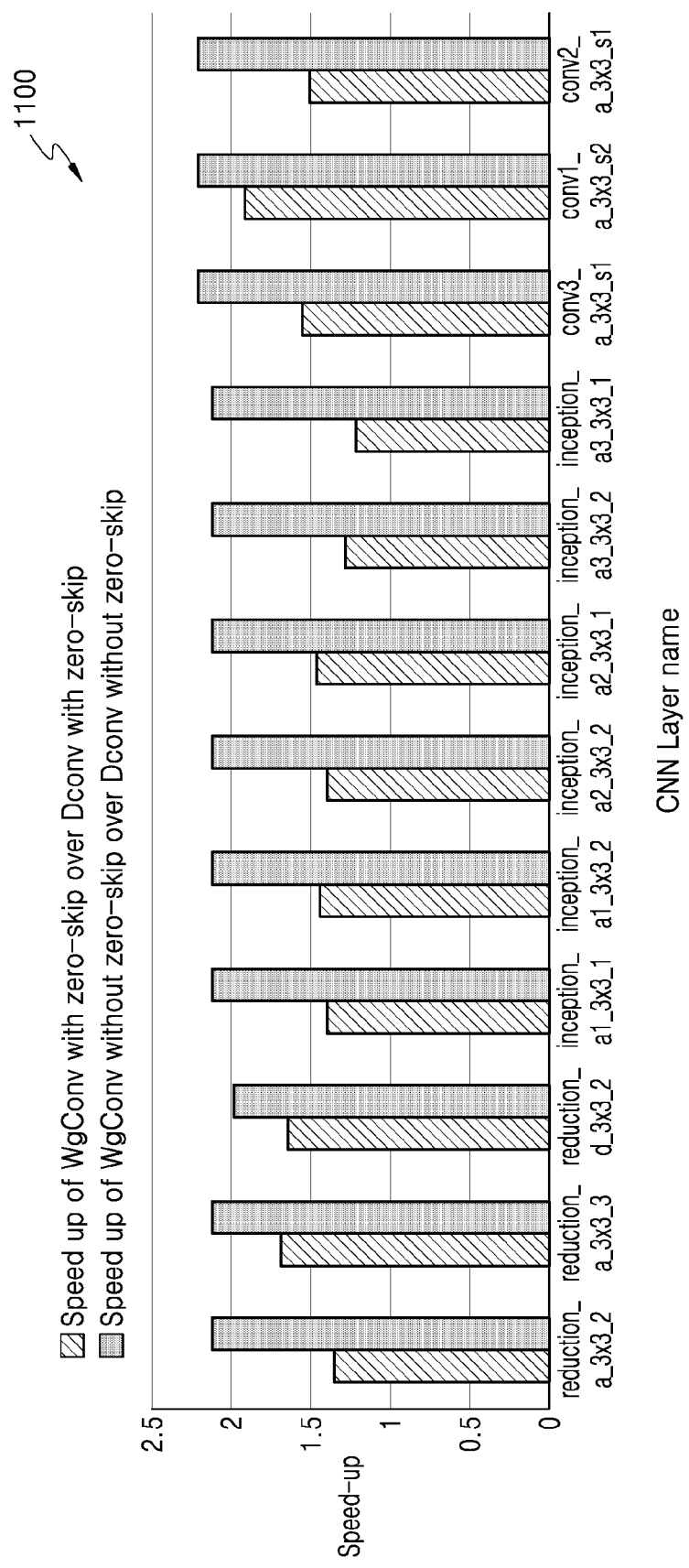
FIG. 11 illustrates an example of a graph depicting experimental speedup or acceleration results for a first example convolution network using the z-first reference NPU.

FIG. 11 illustrates a graph 1100 depicting experimental speedup or acceleration results for a first example convolution network using the z-first reference NPU 500. The first example convolution network is Inception-v3. The IFMs of layers with 3×3 kernel are fed to the Inception-v3 in DConv mode and corresponding transformed IFMs are fed to the Inception-v3 in WgConv mode. X-axis of the graph 1100 indicates various layers of the Inception-v3 and Y-axis of the graph 1100 indicates speed up. Speed up of WgConv with zero skip is compared with speed up of DConv with zero skip and plotted in the graph 1100. Speed up of WgConv without zero skip is compared with speed up of DConv without zero skip and plotted in the graph 1100. As can be gathered from the graph 1100, operations in WgConv modes provides inherent 2.25× speedup for 3×3 convolutions.

Figure 12:
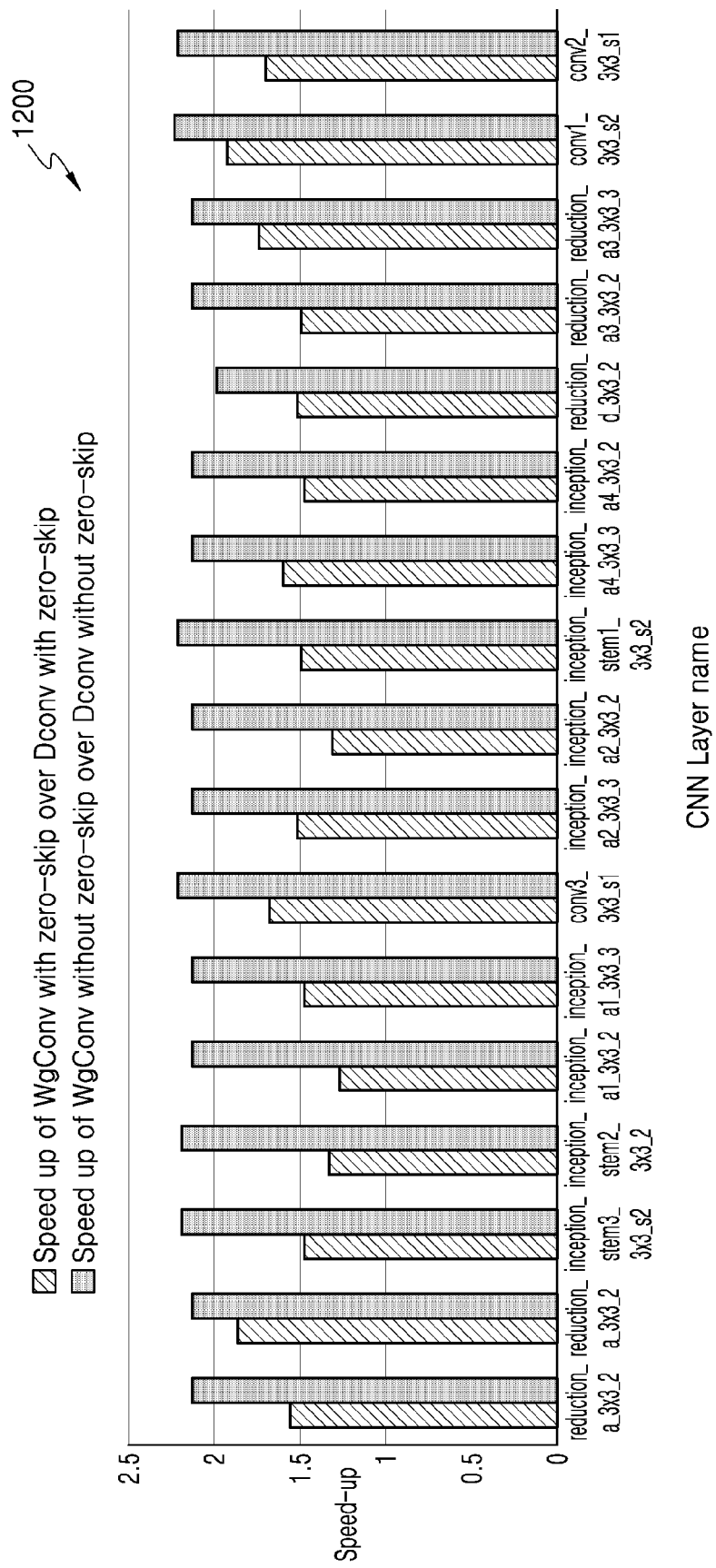
FIG. 12 illustrates an example of a graph depicting experimental speedup or acceleration results for a second example convolution network using the z-first reference NPU.

FIG. 12 illustrates a graph 1200 depicting experimental speedup or acceleration results for a second example convolution network using the z-first reference NPU 500. The second example convolution network is Inception-v4. The IFMs of layers with 3×3 kernel are fed to the Inception-v4 in DConv mode and corresponding transformed IFMs are fed to the Inception-v4 in WgConv mode. X-axis of the graph 1200 indicates various layers of the Inception-v4 and Y-axis of the graph 1200 indicates speed up. Speed up of WgConv with zero skip is compared with speed up of DConv with zero skip and plotted in the graph 1200. Speed up of WgConv without zero skip is compared with speed up of DConv without zero skip and plotted in the graph 1200. As can be gathered from the graph 1200, operations in WgConv modes provide inherent 2.25× speedup for 3×3 convolutions.

To gain faster processing speed and reduce computational complexity, depth-wise separable convolutions are introduced in neural networks implemented specifically in mobile devices, such as smartphones. Example of such mobile based neural networks includes but not limited to MNasNet. Depth-wise separable convolution splits a kernel into two (2) separate kernels that perform two convolutions, a depth-wise convolution and a pointwise convolution. A kernel of size 3×3 is used for the depth-wise convolution while a kernel of size 1×1 is used for the pointwise convolution. In an example, the depth-wise separable convolutions are implemented on the z-first reference NPU 500.

Figure 13:
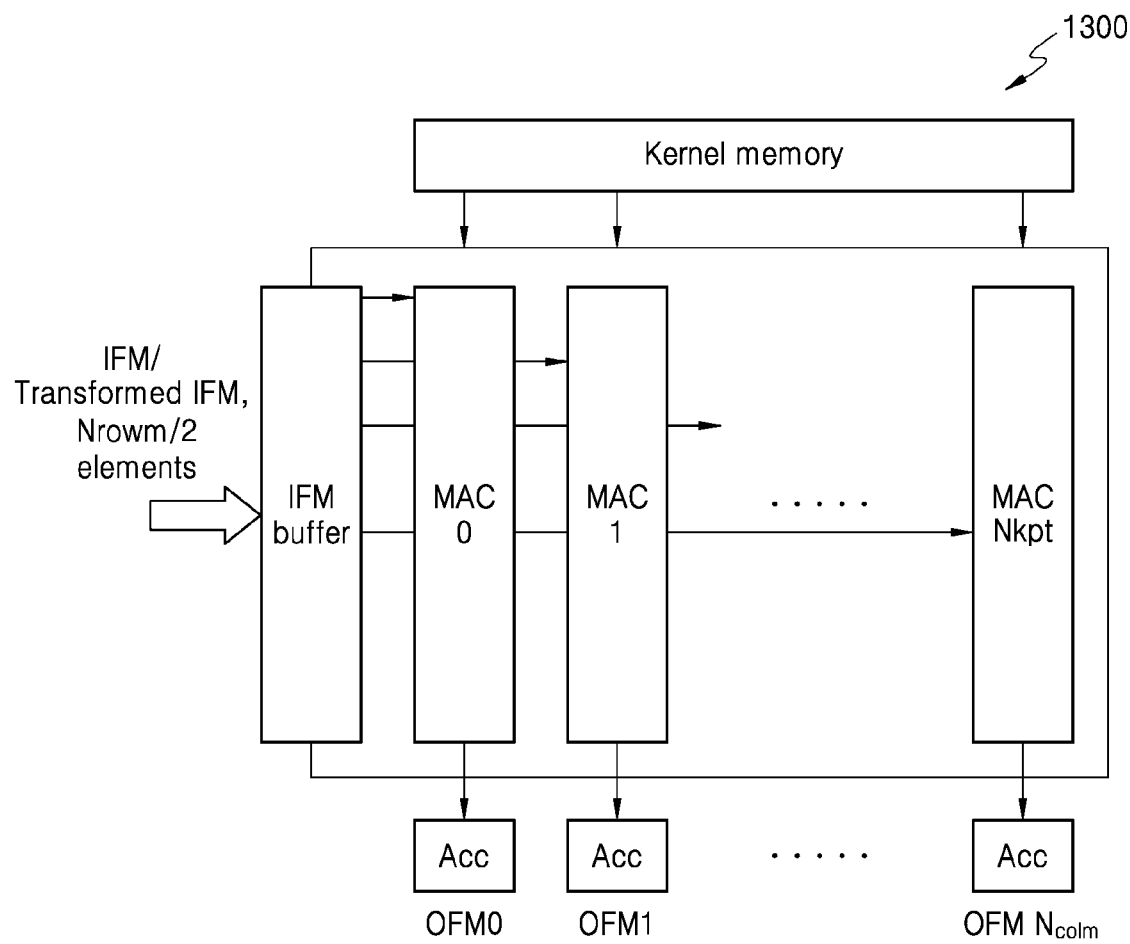
FIG. 13 illustrates an example of reference architecture of the z-first reference NPU for mapping WgConv in depthwise separable convolution.

FIG. 13 illustrates an example of a reference architecture of the z-first reference NPU 1300 for mapping WgConv in depth-wise separable convolutions. Referring to FIG. 13, the NPU 1300 includes 16 MAC units that consist of Nrowm=16 and Ncolm=8 number of MAC rows and columns. In the DConv mode, only diagonal multipliers are provided with the input IFM pixels while outputs of other multipliers are fixed to zeros. As such, only 8 IFMs can be used as the MAC unit is rectangular (i.e., of size 16×8). After 9 cycles, 8×16 OFMs are generated from all MAC units.

Figure 14:
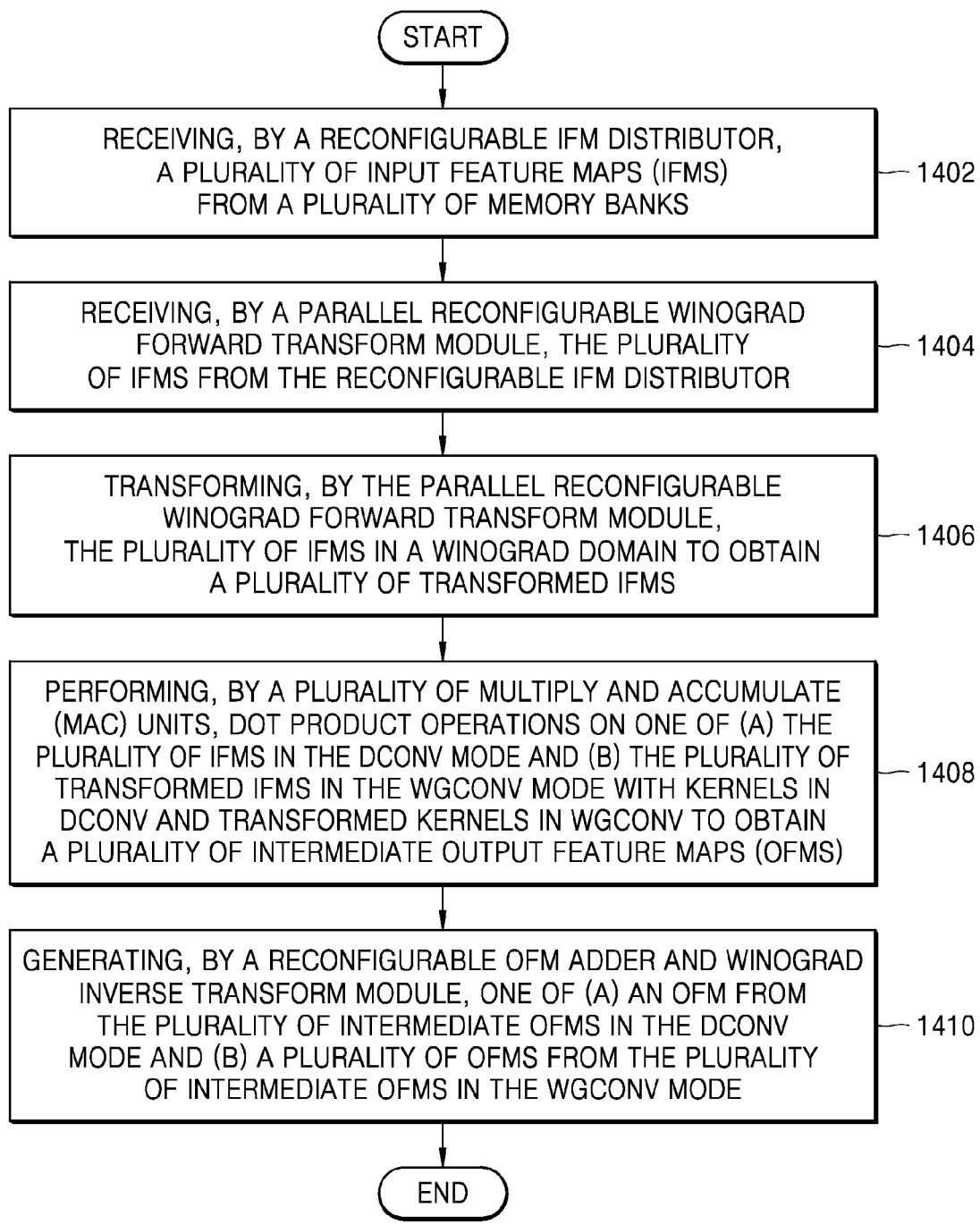
FIG. 14 illustrate an example of a diagram of method of mapping WgConv on the z-first reference NPU.

In the WgConv mode, each of the pixels from transformed IFM block are applied to the 16 MAC units. By performing inverse transform on the output of the MAC units, 8 number of 2×2 OFM blocks can be generated per cycle. As such, this processing speed of the NPU 1300 in the WgConv mode is 2.25× faster compared to the DConv mode. Although there is no scope for zero skipping in this scheme for WgConv, WgConv produces a default speedup of 2.25× compared to DConv zero skip which can produce approximately 1.3× speedup for depth-wise layers FIG. 14 illustrate an example of a method of mapping WgConv on the z-first reference NPU. The operations in FIG. 14 may be performed in the sequence and manner as shown, although the order of some operations may be changed or some of the operations omitted without departing from the spirit and scope of the illustrative examples described. Many of the operations shown in FIG. 14 may be performed in parallel or concurrently. The method 1400 may be implemented by the z-first reference NPU 500 using components thereof, as described above. In addition to the description of FIG. 14 below, the descriptions of FIGS. 5-13 are also applicable to FIG. 14, and are incorporated herein by reference. Thus, the above description may not be repeated here.

At block 1402, the method 1400 includes receiving, by a reconfigurable IFM distributor, a plurality of input feature maps (IFMs) from a plurality of memory banks, wherein the plurality of IFMs are stored in a z-first data storage layout in the plurality of memory banks. Each of the plurality of memory banks is configured to store the plurality of IFMs in one of a direct convolution (DConv) mode and a Winograd convolution (WgConv) mode. In one implementation, each of the plurality of memory banks is configured to store a batch of IFMs from the plurality of IFMs in the DConv mode. In another implementation, each of the plurality of memory banks are configured to store a plurality of channels of each of plurality of coordinates of each of the plurality of IFMs as plurality of IFM blocks in the WgConv mode. In such an implementation, size of each of the IFM block is 4×4.

At block 1404, the method 1400 includes receiving, by a parallel reconfigurable Winograd forward transform module, the plurality of IFMs from the reconfigurable IFM distributor.

At block 1406, the method 1400 includes transforming, by the parallel reconfigurable Winograd forward transform module, the plurality of IFMs in a Winograd domain to obtain a plurality of transformed IFMs.

At block 1408, the method 1400 includes performing, by a plurality of multiply and accumulate (MAC) units, dot product operations on one of (a) the plurality of IFMs in the DConv mode and (b) the plurality of transformed IFMs in the WgConv mode with kernels in DConv mode and transformed kernels in WgConv mode, to obtain a plurality of intermediate output feature maps (OFMs).

At block 1410, the method 1400 includes generating, by a reconfigurable OFM adder and Winograd inverse transform module, one of (a) an OFM from the plurality of intermediate OFMs in the DConv mode and (b) a plurality of OFMs from the plurality of intermediate OFMs in the WgConv mode.

Further, in one implementation, the method 1400 includes selecting, by the parallel reconfigurable Winograd forward transform module, a transform matrix and a transposed transform matrix based on a size of a plurality of kernels and a position of IFM window. The method 1400 includes transforming, by the parallel reconfigurable Winograd forward transform module, the plurality of IFM blocks based on the size of the plurality of kernels, the transform matrix, the transposed transform matrix, and position of IFM window to obtain the plurality of transformed IFMs. In such an implementation, a size of the plurality of kernels is 3×3 and a size of the plurality of transformed IFMs is 4×4.

In an example, the method 1400 includes selecting, by the parallel reconfigurable Winograd forward transform module, a transform matrix and a transposed transform matrix based on a size of a plurality of kernels. The method 1400 includes transforming, by the parallel reconfigurable Winograd forward transform module, the plurality of IFM blocks based on the size of the plurality of kernels and one of (a) the transform matrix and (b) the transposed transform matrix to obtain a plurality of intermediate transformed IFMs. In such an implementation, a size of the plurality of kernels is one of (a) 3×1 and (b) 1×3. In such an implementation, a size of the plurality of intermediate transformed IFMs is one of (a) 4×1 and (b) 1×4. In such an implementation, a size of the plurality of transformed IFMs is 4×4.

In an example, the reconfigurable OFM adder and Winograd inverse transform module is built reusing an OFM adder tree. As such, in one implementation, the method 1400 includes adding, by the reconfigurable OFM adder and Winograd inverse transform module, the plurality of intermediate OFMs to obtain the plurality of OFMs in the DConv mode.

In an example, the method 1400 includes selecting, by the reconfigurable OFM adder and Winograd inverse transform module, an inverse transformation matrix and a transposed inverse transformation matrix based on a size of a plurality of kernels. The method 1400 includes transforming, by the reconfigurable OFM adder and Winograd inverse transform module, the plurality of intermediate OFMs based on the size of the plurality of kernels, the inverse transformation matrix, and the transposed inverse transformation matrix to obtain the plurality of OFMs in the WgConv mode. In such implementation, a size of the plurality of kernels is 3×3.

In an example, the method 1400 includes selecting, by the reconfigurable OFM adder and Winograd inverse transform module, an inverse transformation matrix and a transposed inverse transformation matrix based on a size of a plurality of kernels. The method 1400 includes transforming, by the reconfigurable OFM adder and Winograd inverse transform module, the plurality of intermediate OFMs based on the size of the plurality of kernels and one of (a) the inverse transformation matrix and (b) the transposed inverse transformation matrix to obtain the plurality of OFMs in the WgConv mode. In such implementation, a size of the plurality of kernels is one of (a) 3×1 and (b) 1×3.

Further, the method 1400 includes skipping, by a plurality of zero-skip modules, zero-value elements from one of (a) the plurality of IFMs received from the plurality of IFM buffers in the DConv mode and (b) the plurality of transformed IFMs received from the parallel reconfigurable Winograd forward transform module in the WgConv mode.

Some advantages of the present disclosure include, but not limited to, achieving reduction in multiplications by efficiently mapping WgConv as an alternative to DConv for certain kernel dimensions on the z-first reference NPU architecture with minimal changes. This leads to improved throughput and energy savings.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A z-first reference neural processing circuitry (NPU) for mapping Winograd Convolution supporting both direct convolution (DConv) mode and Winograd convolution (WgConv) mode, the NPU comprising:
    memory banks configured to store input feature maps (IFMs) in a z-first data storage layout, each of the memory banks being configured to store the IFMs in one of the DConv mode or the WgConv mode;
    a reconfigurable IFM distributor circuitry configured to receive the IFMs from the memory banks;
    a parallel reconfigurable Winograd forward transform circuitry configured to receive the IFMs from the reconfigurable IFM distributor and to transform the IFMs in a Winograd domain to transformed IFMs in the WgConv mode;
    multiply and accumulate (MAC) circuitries configured to perform dot product operations on one of IFMs in the DConv mode and the transformed IFMs in the WgConv mode to obtain intermediate output feature maps (OFMs); and
    a reconfigurable OFM adder and Winograd inverse transform circuitry configured to generate one of an OFM from the intermediate OFMs in the DConv mode and OFMs from the intermediate OFMs in the WgConv mode,
    wherein each of the memory banks are further configured to store a batch of IFMs from the IFMs in the DConv mode and store channels of each of coordinates of each of the IFMs in the WgConv mode as IFM blocks.

2. The NPU of claim 1, wherein a size of each of the IFM block is 4×4.

3. The NPU of claim 1, wherein the parallel reconfigurable Winograd forward transform circuitry is further configured to:
    select a transform matrix and a transposed transform matrix based on a size of kernels and a position of IFM window; and
    transform the IFM blocks based on the size of the kernels, the transform matrix, and the transposed transform matrix to obtain the transformed IFMs.

4. The NPU of claim 3, wherein:
    the size of the kernels is 3×3; and
    a size of the transformed IFMs is 4×4.

5. The NPU of claim 1, wherein the parallel reconfigurable Winograd forward transform circuitry is further configured to:
    select a transform matrix and a transposed transform matrix based on a size of kernels; and
    transform the IFM blocks based on the size of the kernels and one of the transform matrix and the transposed transform matrix to obtain the transformed IFMs.

6. The NPU of claim 5, wherein:
    the size of the kernels is one of 3×1 and 1×3; and
    a size of the transformed IFMs is one of 4×1 and 1×4.

7. The NPU of claim 1, wherein the reconfigurable OFM adder and Winograd inverse transform circuitry is built using an OFM adder tree.

8. The NPU of claim 7, wherein the reconfigurable OFM adder and Winograd inverse transform circuitry is further configured to:
    add the intermediate OFMs to obtain the OFM in the DConv mode.

9. The NPU of claim 7, wherein the reconfigurable OFM adder and Winograd inverse transform circuitry is further configured to:
    select an inverse transformation matrix and a transposed inverse transformation matrix based on a size of kernels; and
    transform the intermediate OFMs based on the size of the kernels, the inverse transformation matrix, and the transposed inverse transformation matrix to obtain the OFMs in the WgConv mode.

10. The NPU of claim 9, wherein the size of the kernels is 3×3.

11. The NPU of claim 7, wherein the reconfigurable OFM adder and Winograd inverse transform circuitry is further configured to:
    select an inverse transformation matrix and a transposed inverse transformation matrix based on a size of kernels; and
    transform the intermediate OFMs based on the size of the kernels and one of the inverse transformation matrix and the transposed inverse transformation matrix to obtain the OFMs in the WgConv mode.

12. The NPU of claim 11, wherein the size of the kernels is one of 3×1 and 1×3.

13. The NPU of claim 1, further comprising zero-skip circuitries to skip zero-value elements from one of the IFMs received from IFM buffers in the DConv mode and the transformed IFMs received from the parallel reconfigurable Winograd forward transform circuitry in the WgConv mode.

14. A method for mapping Winograd Convolution on a z-first reference neural processing circuitry (NPU) supporting both direct convolution (DConv) mode and Winograd convolution (WgConv) mode comprising:
    receiving, by a reconfigurable IFM distributor circuitry, input feature maps (IFMs) from memory banks, wherein the IFMs are stored in a z-first data storage layout in the memory banks, each of the memory banks being configured to store the IFMs in one of the DConv mode or the WgConv mode;
    receiving, by a parallel reconfigurable Winograd forward transform circuitry, the IFMs from the reconfigurable IFM distributor circuitry;
    transforming, by the parallel reconfigurable Winograd forward transform circuitry, the IFMs in a Winograd domain to obtain transformed IFMs in the WgConv mode;
    performing, by multiply and accumulate (MAC) circuitries, dot product operations on one of the IFMs in the DConv mode and the transformed IFMs in the WgConv mode to obtain intermediate output feature maps (OFMs); and
    generating, by a reconfigurable OFM adder and Winograd inverse transform circuitry, one of an OFM from the intermediate OFMs in the DConv mode and OFMs from the intermediate OFMs in the WgConv mode,
    wherein each of the memory banks are further configured to store a batch of IFMs from the IFMs in the DConv mode and store channels of each of coordinates of each of the IFMs in the WgConv mode as IFM blocks.

15. The method of claim 14, wherein the transforming of the IFMs comprises:
    selecting, by the parallel reconfigurable Winograd forward transform circuitry, a transform matrix and a transposed transform matrix based on a size of kernels and a position of IFM window; and
    transforming, by the parallel reconfigurable Winograd forward transform circuitry, the IFMs based on the size of the kernels, the transform matrix, and the transposed transform matrix to obtain the transformed IFMs.

16. The method of claim 15, wherein the size of the kernels is 3×3.

17. The method of claim 14, further comprising:
    selecting, by the parallel reconfigurable Winograd forward transform circuitry, a transform matrix and a transposed transform matrix based on a size of kernels; and
    transforming, by the parallel reconfigurable Winograd forward transform circuitry, the IFMs based on the size of the kernels and one of the transform matrix and the transposed transform matrix to obtain intermediate transformed IFMs.

18. The method of claim 17, wherein:
the size of the kernels is one of 3×1 and 1×3;
a size of the intermediate transformed IFMs is one of 4×1 and 1×4; and
a size of the transformed IFMs is 4×4.

* * * * *